United States Patent
Yamada et al.

(10) Patent No.: US 7,441,840 B2
(45) Date of Patent: Oct. 28, 2008

(54) RECLINING APPARATUS FOR VEHICLE SEAT

(75) Inventors: Yukifumi Yamada, Toyota (JP); Yasuhiro Kojima, Kariya (JP)

(73) Assignee: Aisin Seiki Kabushiki Kaisha, Jariya-Shi, Aichi-Ken (JP)

( * ) Notice: Subject to any disclaimer, the term of this patent is extended or adjusted under 35 U.S.C. 154(b) by 0 days.

(21) Appl. No.: 11/593,054

(22) Filed: Nov. 6, 2006

(65) Prior Publication Data
US 2007/0102982 A1 May 10, 2007

(30) Foreign Application Priority Data
Nov. 7, 2005 (JP) ............................. 2005-322778

(51) Int. Cl.
*B60N 2/02* (2006.01)
*B60N 2/20* (2006.01)
(52) U.S. Cl. .................................... 297/367
(58) Field of Classification Search ................. 297/367
See application file for complete search history.

(56) References Cited

U.S. PATENT DOCUMENTS

| | | | |
|---|---|---|---|
| 5,622,407 A * | 4/1997 | Yamada et al. .............. 297/367 |
| 5,857,746 A * | 1/1999 | Barrere et al. .............. 297/367 |
| 6,325,458 B1* | 12/2001 | Rohee et al. ............ 297/367 X |
| 6,474,740 B1 | 11/2002 | Kondo et al. |
| 6,854,802 B2 | 2/2005 | Matsuura et al. |
| 6,908,156 B1* | 6/2005 | Park et al. ............... 297/367 X |
| 2001/0001220 A1 | 5/2001 | Rohee et al. |
| 2002/0017811 A1* | 2/2002 | Cilliere et al. .............. 297/367 |
| 2007/0145801 A1 | 6/2007 | Yamada et al. |

FOREIGN PATENT DOCUMENTS

| | | |
|---|---|---|
| JP | 2000-342368 A | 12/2000 |
| JP | 2001-299489 A | 10/2001 |
| JP | 2002-112849 A | 4/2002 |

\* cited by examiner

*Primary Examiner*—Anthony D. Barfield
(74) *Attorney, Agent, or Firm*—Buchanan Ingersoll & Rooney PC

(57) ABSTRACT

A reclining apparatus for a vehicle seat includes a lower plate, an upper plate rotatably supported by each lower plate, a cam for restricting or permitting rotation of each upper plate relative to each lower plate, a connecting shaft fitted to each cam with a fit clearance for integrally rotating each cam and a spring wound around a rotational axis of each cam for biasing each cam in a rotational direction in which rotation of each upper plate relative to each lower plate is restricted. A first end of each spring is engaged with each lower plate and a second end of each spring is engaged with each cam. The spring includes a pressing portion for pressing the connecting shaft so that a play corresponding to the fit clearance between each cam and the connecting shaft can be eliminated.

15 Claims, 7 Drawing Sheets

US 7,441,840 B2

RECLINING APPARATUS FOR VEHICLE SEAT

CROSS REFERENCE TO RELATED APPLICATIONS

This application is based on and claims priority under 35 U.S.C. §119 to Japanese Patent Application 2005-322778, filed on Nov. 7, 2005, the entire content of which is incorporated herein by reference.

FIELD OF THE INVENTION

This invention generally relates to a reclining apparatus. More specifically, this invention pertains to a reclining apparatus for a vehicle seat.

BACKGROUND

Conventionally, various reclining apparatuses for vehicle seats are suggested. Generally, reclining apparatuses for vehicle seats are utilized for reclining a seat back relative to a seat cushion. Such reclining apparatuses for vehicle seats include a lock mechanism provided each right and left side of a seat for restricting rotation of the seat back relative to the seat cushion. Switching operations (lock, unlock) of the lock mechanism enables to adjust the seat back to a desired reclining angle preferable for an occupant to have a seat and to retain the desired reclining angle.

For example, a reclining apparatus for a vehicle disclosed in JP2001-299489A (Patent document 1) includes a spring (18) wound around a rotational shaft of a connecting shaft (17) for connecting lock mechanisms provided at right and left sides of a seat. A first end of the spring is connected to a lower plate (7). A second end of the spring is connected to the connecting shaft. The spring biases a cam (16) of each lock mechanism through the connecting shaft so that a teeth portion (13) of an upper plate (8) engages with a teeth portion (12) of a pawl (11) of each lock mechanism to restrict rotation of a seat back relative to a seat cushion. However, because the spring biases each cam through the connecting shaft, if there is an assembly error between the right and left lock mechanisms in a rotational direction caused by, for example, strain of a seat frame or a floor surface, there is a possibility that, while one of the lock mechanisms can retain engagement described above, the other of the lock mechanisms cannot retain the engagement caused by insufficient biasing force.

On the other hand, a reclining apparatus for a vehicle disclosed in JP2000-342368A (Patent document 2) includes a spring (5) wound around a rotational shaft of a cam (32). A first end of the spring is connected to a lower plate (1). A second end of the spring is connected to a groove portion (32f) of the cam. The spring biases the cam so that a teeth portion (25a) of an upper plate (2) engages with a teeth portion (33a) of a pawl (33). Accordingly, rotation of a seat back relative to a seat cushion can be restricted without depending on a connecting shaft (4). An operational lever (7) is provided at the connecting shaft as a unit.

In the reclining apparatus for the vehicle disclosed in the Patent document 2, there is a fit clearance between the connecting shaft and the cam. The width of the fit clearance is set to a value sufficient for absorbing assembly error in a rotational direction between the right and left lock mechanisms. The fit clearance causes to generate a play of the operational lever in an operational direction corresponding to the rotational direction described above. Accordingly, operation of the operational lever is accompanied by uncomfortable feeling that the operational lever is not well restrained. There is also a possibility that the operational lever shakes in a range of the fit clearance and clatters with the connecting shaft, which results in noises, for example, at the time when a vehicle is in motion.

A need thus exists for a reclining apparatus for a vehicle seat, which can give comfortable operational feeling while an increase in number of parts is restricted. The present invention has been made in view of the above circumstances and provides such a reclining apparatus for a vehicle seat.

SUMMARY OF THE INVENTION

According to an aspect of the present invention, a reclining apparatus for a vehicle seat includes a lower plate provided at each side of either one of a seat cushion and a seat back, an upper plate provided at each side of the other of the seat cushion and the seat back and rotatably supported by each lower plate, a cam operatively connected to each lower and upper plate for restricting or permitting rotation of each upper plate relative to each lower plate as each cam rotates, a connecting shaft fitted to each cam with a fit clearance for integrally rotating each cam in order to permit the rotation of each upper plate relative to each lower plate according to operational force inputted to the connecting shaft and a spring wound around a rotational axis of each cam for biasing each cam in a rotational direction in which the rotation of each upper plate relative to each lower plate is restricted. A first end of each spring is engaged with each lower plate and a second end of each spring is engaged with each cam. The spring includes a pressing portion for pressing the connecting shaft in a first rotational direction so that a play corresponding to the fit clearance between each cam and the connecting shaft can be eliminated.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
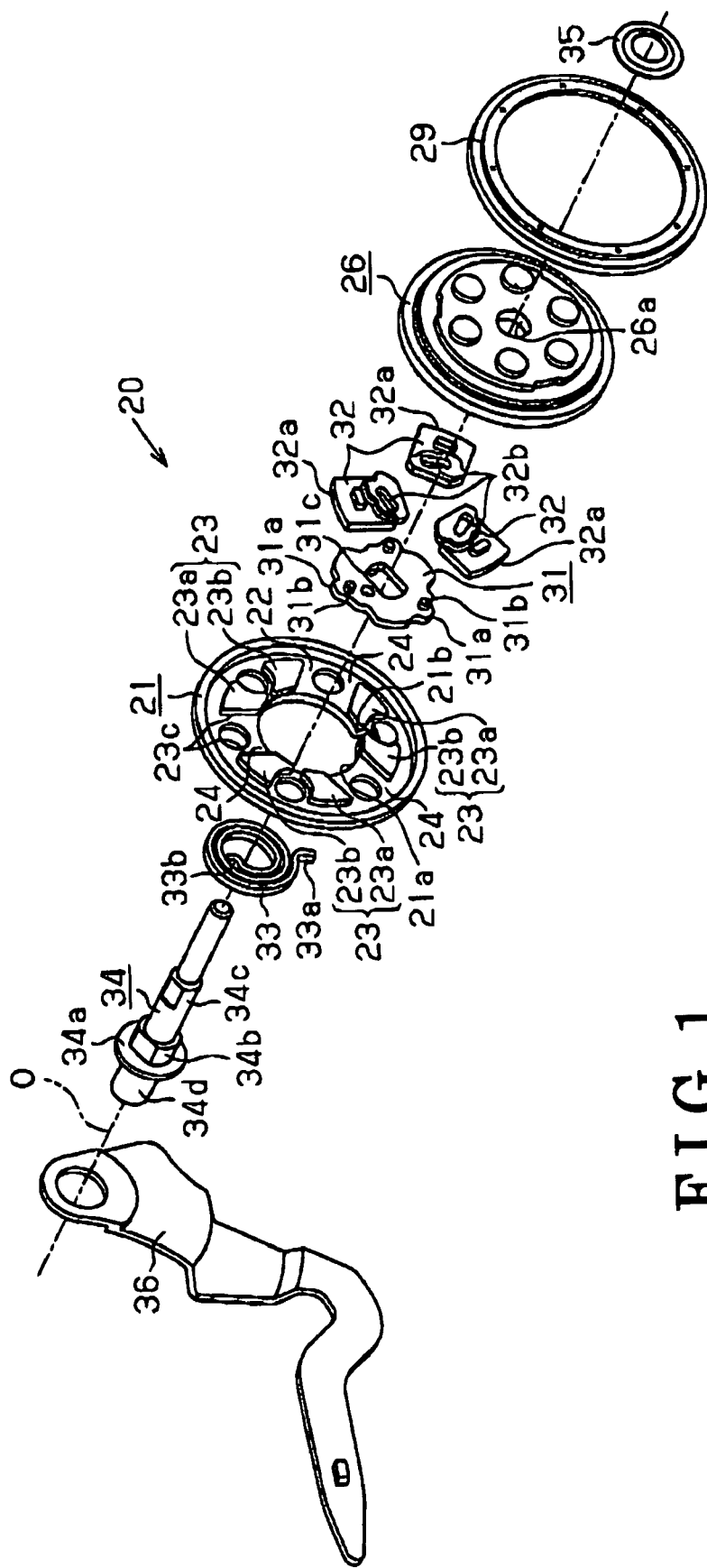
FIG. 1 represents an exploded perspective view illustrating a reclining apparatus for a vehicle seat according to a first embodiment of the present invention.
Figure 2:
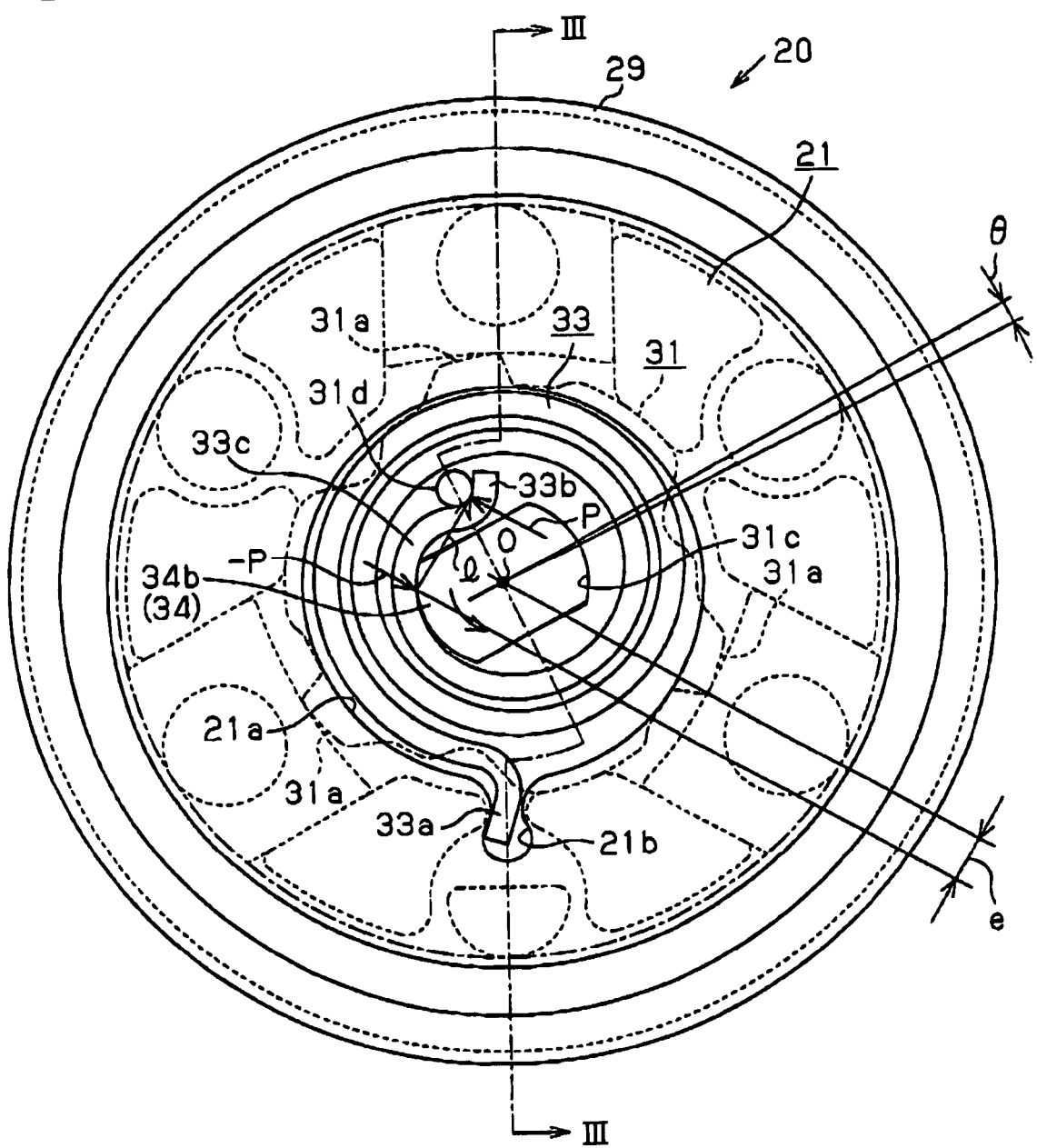
FIG. 2 represents a front view illustrating the reclining apparatus for the vehicle seat according to the first embodiment of the present invention.
Figure 3:
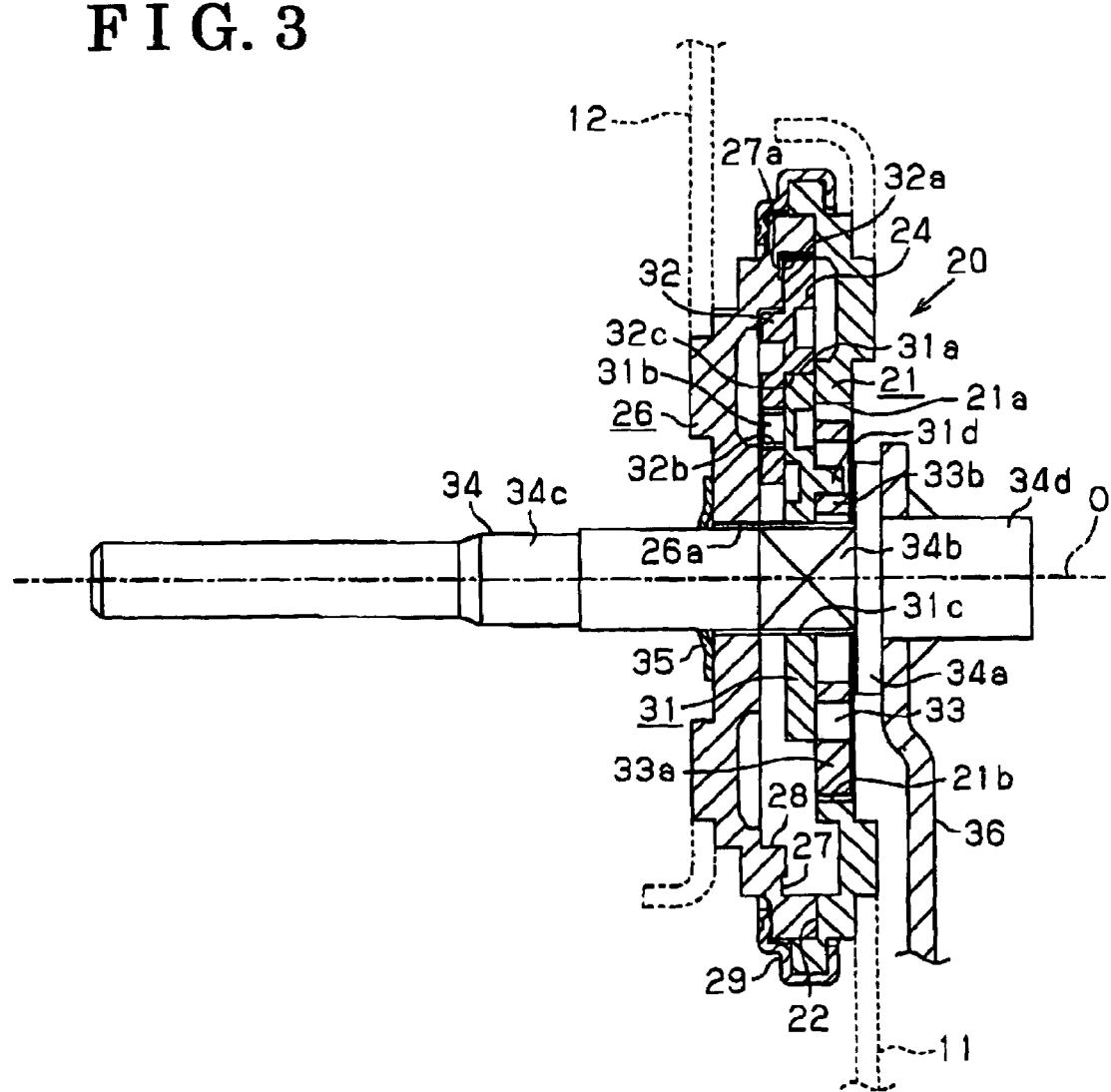
FIG. 3 represents a cross-sectional view taken on line III-III of FIG. 2.

A first embodiment of the present invention will be explained with reference to drawing figures. FIG. 1 represents an exploded perspective view illustrating a reclining apparatus for a vehicle seat mounted on a vehicle such as an automobile. FIG. 2 represents a front view illustrating the reclining apparatus for the vehicle seat. FIG. 3 represents a cross-sectional view taken on line III-III of FIG. 2. The reclining apparatus for the vehicle seat has a configuration basically illustrated in FIGS. 1 to 3 arranged at each side of the vehicle seat in a width direction. In these figures, a configuration provided at a right side as seen from a back to a front of a vehicle is representatively illustrated. Explanations below will be made assuming that configurations provided at respective sides are common and representatively taking an example of the configuration provided at the right side.

As illustrated in FIG. 3, the reclining apparatus for the vehicle includes a seat cushion frame 11 which is made of a metal plate and which serves as a skeleton of a seat cushion. A seat back frame 12, which is made of a metal plate and which serves as a skeleton of a seat back, is connected to the seat cushion frame 11 rotatably around a rotational axis O as a center through a lock mechanism 20. The lock mechanism 20 switches a state of the seat back frame 12 relative to the seat cushion frame 11 between a state where rotation of the seat back frame 12 relative to the seat cushion frame 11 is restricted and a state where the rotation of the seat back frame 12 relative to the seat cushion frame 11 is permitted. Basically, the lock mechanism 20 holds the state where the rotation of the seat back frame 12 relative to the seat cushion frame 11 is restricted.

Next, the lock mechanism 20 will be explained. A lower plate 21 is fixed to an inside surface of the seat cushion frame 11 by welding. The lower plate 21 is formed by half die cutting (half blanking) of a metal plate. As illustrated in FIG. 1, the lower plate 21 is formed as a ring shape having a penetrating hole 21a at a center portion. The lower plate 21 includes an engaging hole 21b formed to recess contiguously from the penetrating hole 21a and outwardly in a diametrical direction.

The lower plate 21 further includes a recessed portion 22 formed to recess in a circular shape at an opposite side from the seat cushion frame 11. The recessed portion 22 includes plural (three) protruding portions 23 formed to protrude from a bottom wall of the recessed portion 22 at predetermined angle intervals. Each protruding portion 23 includes two formed portions 23a and 23b divided into two sections arranged in a peripheral direction. Each protruding portion 23 further includes a side surface 23c, which extends flatly in a diametrical direction. The side surfaces 23c of adjacent protruding portions 23 are parallel to each other. The lower plate 21 further includes a guide groove 24 formed to extend in a diametrical direction between adjacent side surfaces 23c.

As illustrated in FIGS. 1 and 3, an upper plate 26 is fixed to an inside surface of the seat back frame 12 by welding. The upper plate 26 is formed by half die cutting of a metal plate. An outer diameter of the upper plate 26 is similar to an inner diameter of the recessed portion 22 of the lower plate 21. The upper plate 26 is formed as a ring shape having a shaft insertion hole 26a at a center portion. The upper plate 26 is assembled with the lower plate 21 so that an outer peripheral surface of the upper plate 26 slides along the inner peripheral surface of the recessed portion 22 of the lower plate 21. In other words, the upper plate 26 is rotatably supported by the lower plate 21. By this, the seat back frame 12 is rotatably connected to the seat cushion frame 11 through the lower plate 21 and the upper plate 26 (lock mechanism 20).

As illustrated in FIG. 3, the upper plate 26 includes a first recessed portion 27 formed to recess in a circular shape at an opposite side from the seat back frame 12 (lower plate 21 side). Inner teeth 27a are formed at an inner peripheral surface of the first recessed portion 27. In a state where the upper plate 26 is assembled with the lower plate 21, the inner teeth 27a face the guide groove 24 in a diametrical direction. A second recessed portion 28 is formed to further recess from the first recessed portion 27 coaxially with the first recessed portion 27 in a circular shape. An inner diameter of the second recessed portion 28 is smaller than that of the first recessed portion 27.

A ring-shaped holder 29 made of a metal plate is assembled with the upper plate 26 and the lower plate 21 assembled together so that the holder 29 surrounds an outer peripheral portion of the upper plate 26 and the lower plate 21. The holder 29 holds the lower plate 21 and the upper plate 26 so that the upper plate 26 does not detach from the lower plate 21 in an axial direction in a state where rotation of the upper plate 26 relative to the lower plate 21 is permitted.

In a state where the upper plate 26 is assembled with the lower plate 21, the recessed portion 22 and the first and second recessed portions 27 and 28 form an inner space. A cam 31 formed by half die cutting of a metal plate is accommodated in the inner space rotatably around the rotational axis O as a center. As illustrated in FIG. 1, the cam 31 includes plural (three) cam portions 31a, which extend in a diametrical direction at predetermined angle intervals. Each cam portion 31a includes a pin-shaped protrusion 31b formed to protrude in parallel with an axial direction toward the upper plate 26. The cam 31 further includes a fitting hole 31c formed to penetrate a center of the cam 31 in an axial direction. A cross-sectional shape of the fitting hole 31c is a compressed circle shape (a shape of an approximate oval Japanese old coin). As illustrated in FIG. 3, the cam 31 further includes a pin-shaped protruding portion 31d formed to protrude in parallel with an axial direction toward the lower plate 21. In a state where the cam 31 is accommodated between the lower plate 21 and the upper plate 26 (inner space), the protruding portion 31d is positioned in a middle portion between the penetrating hole 21a and the fitting hole 31c in a diametrical direction. At the same time, a position of the protruding portion 31d corresponds to that of the penetrating hole 21a (and the engaging hole 21b) regarding an axial direction.

As illustrated in FIG. 1, a pawl 32 is provided in each guide groove 24. The pawl 32 is formed to be a rectangular plate shape. A width of the pawl 32 is slightly smaller than that of the guide groove 24 in a peripheral direction of the guide groove 24. Each pawl 32 slides along the side surface 23c of the protruding portion 23 so that movement of each pawl 32 in a diametrical direction can be guided. Outer teeth 32a is formed at an end portion of each pawl 32. The outer teeth 32a engages with the inner teeth 27a (refer to FIG. 3) of the upper plate 26. A cam hole 32b is formed at a base end portion of each pawl 32. The cam hole 32b penetrates the pawl 32 in a thickness direction. The cam hole 32b slants from a peripheral direction around the rotational axis O as a center. Each protrusion 31b of the cam 31 is inserted into the cam hole 32b of each pawl 32. By doing so, each pawl 32 engages with the cam 31.

As illustrated in FIG. 3, each pawl 32 further includes an axially stepped portion set between the outer teeth 32a and the cam hole 32b. An end surface of the stepped portion, which faces the cam 31 in a diametrical direction, forms a pawl cam surface 32c. The pawl cam surface 32c crosses side surfaces of the pawl 32 and extends so that the pawl cam surface 32c has a slanting angle relative to a pitch circle of the outer teeth 32a. An end surface of the cam portion 31a contacts with the pawl cam surface 32c of the pawl 32. By doing so, each pawl 32 engages with the cam portion 31a.

In other words, in a state where the cam 31 and each pawl 32 are accommodated between the lower plate 21 and the upper plate 26 (inner space), when the cam 31 rotates in a first direction (clockwise in FIG. 1), the cam hole 32b of each pawl 32 is pressed by each protrusion 31b of the cam 31. By doing so, each pawl 32 moves in a diametrical direction along each guide groove 24 so that each pawl 32 is pulled back. At this time, engagement of the outer teeth 32a of each pawl 32 with the inner teeth 27a of the upper plate 26 is released. By doing so, the upper plate 26 becomes rotatable relative to the lower plate 21. Thus, a state, where rotation of the upper plate 26 relative to the lower plate 21 is permitted, is set.

On the other hand, when the cam 31 rotates in a second direction (counterclockwise in FIG. 1), the cam hole 32b of each pawl 32 is pressed by each protrusion 31b of the cam 31. At the same time, the pawl cam surface 32c of each pawl 32 is pressed by the end surface of each cam portion 31a. By doing so, each pawl 32 moves in a diametrical direction along each guide groove 24 so that each pawl 32 protrudes. At this time, the outer teeth 32a of each pawl 32 engages with the inner teeth 27a of the upper plate 26. Accordingly, the upper plate 26 cannot rotate relative to the lower plate 21. Thus, a state, where the rotation of the upper plate 26 relative to the lower plate 21 is restricted, is set.

A spring 33 is accommodated in a center portion of the lower plate 21, in other words, at an inner peripheral side of the penetrating hole 21a. The spring 33 is made of a wire material having an approximate rectangular cross-section and formed to curve in a spiral shape. A first end 33a of the spring 33 is engaged with the engaging hole 21b of the lower plate 21. A second end 33b of the spring 33 is engaged with the protruding portion 31d of the cam 31. The spring 33 is wound around the rotational axis O of the cam 31 so that the fitting hole 31c opens in an axial direction. The spring 33 biases the cam 31 so that the cam 31 rotates in the second direction (counterclockwise in FIG. 1) relative to the lower plate 21. In other words, the spring 33 biases the cam 31 so that the state, where the rotation of the upper plate 26 relative to the lower plate 21 is restricted, is set.

Accordingly, the cam 31 basically retains the state where the rotation of the upper plate 26 relative to the lower plate 21 is restricted by biasing force of the spring 33. At this time, a state, where rotation of the seat back frame 12 relative to the seat cushion frame 11 is restricted, is retained. Then, when the cam 31 rotates clockwise in the figure relative to the lower plate 21 against the spring 33, the restricted state is switched to the state where the rotation of the upper plate 26 relative to the lower plate 21 is permitted.

A connecting shaft 34 is sequentially inserted into the penetrating hole 21a of the lower plate 21, in which the spring 33 is accommodated, the fitting hole 31c of the cam 31 and the shaft-insertion hole 26a of the upper plate 26. The connecting shaft 34 is made of a metal rod. The connecting shaft 34 integrally includes a flange 34a, which extends outwardly, a fitting portion 34b provided to protrude from the flange 34a in a first direction of an axial direction (toward lower plate 21) and a connecting portion 34c provided contiguously from the fitting portion 34b to further protrude in the first direction of the axial direction. A cross-sectional shape of the fitting portion 34b is a compressed circle shape (a shape of an approximate oval Japanese coin). The fitting portion 34b fits to the fitting hole 31c with a clearance in a rotational direction. A circular push nut 35 is attached to an end portion of the connecting shaft 34, which protrudes from the shaft-insertion hole 26a, so that an axial position of the connecting shaft 34 can be determined between the flange 34a, which is close to the spring 33, and the push nut 35. At this time, the fitting portion 34b is positioned so that an axial position of the fitting portion 34b corresponds to a position of the fitting hole 31c (refer to FIG. 3). The fitting portion 34b is connected to the cam 31 so that the fitting portion 34b rotates with the cam 31 as a unit. The spring 33 is positioned on the basis of a fit position of the connecting shaft 34 to the cam 31 regarding an axial position.

The connecting portion 34c of the connecting shaft 34 is connected to a corresponding connecting portion 34c of an opposite connecting shaft 34 so that two connecting shafts 34 rotate as a unit. A cooperative rotation of both connecting shafts 34 integrally rotates both cams 31, of which the fitting holes 31c are fitted to the fitting portions 34b of respective connecting shafts 34. Here, each connecting shaft 34, which integrally rotates each cam 31, is fitted to each cam 31 with a fit clearance in a rotational direction to absorb assembly error in the rotational direction between both lock mechanisms 20.

The connecting shaft 34 further integrally includes an attachment portion 34d provided to protrude from the flange 34a toward a second direction of an axial direction (opposite side from the lower plate 21). The attachment portion 34d is inserted to an operational lever 36. By doing so, the operational lever 36 is attached to one of the connecting shafts 34 illustrated in FIG. 1 so that the operational lever 36 rotates with the connecting shaft 34 as a unit. Operational force for rotating both cams 31 relative to the lower plate 21 clockwise in the figure against the spring 33 through the connecting shafts 34 is inputted from the operational lever 36. In other words, operational force for switching the restricted state to the state, where the rotation of the upper plate 26 relative to the lower plate 21 is permitted, is inputted from the operational lever 36.

Here, the spring 33 in the present embodiment will be further explained. As illustrated in FIG. 2, the spring 33 is wound counterclockwise in the figure from an inner peripheral side to an outer peripheral side. A first end 33a of the spring 33 positioned at the outer peripheral side is bent outwardly in a diametrical direction and is inserted into and engaged with the engaging hole 21b. A second end 33b of the spring 33 positioned at the inner peripheral side is bent outwardly in a diametrical direction and is pressed from the rotational axis O side toward the protruding portion 31d and engaged with the protruding portion 31d. The spring 33 further includes a curved portion 33c near the protruding portion 31d at a counterclockwise rotational direction side therefrom. The curved portion 33c serves as a pressing portion for elastically pressing a corner portion of the fitting portion 34b, of which a shape is an approximate oval Japanese old coin. As described above, there is the fit clearance between the cam 31 (fitting hole 31c) and the connecting shaft 34 (fitting portion 34b) in a rotational direction. Accordingly, there is a play angle θ between the cam 31 (fitting hole 31c) and the connecting shaft 34 (fitting portion 34b) defined around the rotational axis O as a center. The curved portion 33c presses the connecting shaft 34 counterclockwise in the figure so that the play angle θ corresponding to the fit clearance can be eliminated. In other words, the curved portion 33c presses the connecting shaft 34 in a rotational direction in which the cam 31 restricts the rotation of the upper plate 26 relative to the lower plate 21. It is needless to say that the curved portion 33c presses the connecting shaft 34 at a position axially adjacent to an axial fit position of the connecting shaft 34 to the cam 31.

In detail, regarding the vicinity of the rotational shaft O, pressing force of the spring 33 is generated at the second end 33b and the curved portion 33c. Assuming that pressing force generated at the second end 33b and applied to the cam 31 (protruding portion 31d) is p, pressing force generated at the curved portion 33c and applied to the connecting shaft 34 (fitting portion 34b) is −p, of which strength is the same as the pressing force p and of which a direction is opposite, and a distance between the second end 33b and the curved portion 33c is 1, torque T generated by the spring 33 and applied to the cam 31 is given by an equation $T=p \times 1$.

Because a position, to which the pressing force −p is applied, is offset from the rotational axis O by the amount of eccentricity e, rotational torque applied to the connecting shaft 34 is $-p \times e$. Accordingly, the connecting shaft 34 is biased counterclockwise in the figure relative to the cam 31. Accordingly, the play angle θ corresponding to the fit clearance between the cam 31 and the connecting shaft 34 can be eliminated.

In the configuration described above, in a situation where operational force is inputted to the connecting shaft 34 from the operational lever 36 in order to permit the rotation of the upper plate 26 relative to the lower plate 21, because the play angle θ corresponding to the fit clearance is eliminated, preferable operational feeling can be obtained. In other words, at an initial stage of an operation, operational force is necessary for rotating the connecting shaft 34 against the pressing force of the curved portion 33c of the spring 33. After that, operational force is necessary for rotating the connecting shaft 34 with the cam 31 against the biasing force of the spring 33. Accordingly, operational feeling that the operational lever 36 is well restrained can be obtained during operation.

As detailed above, according to the present embodiment, following effects can be obtained.

(1) According to the present embodiment, because the curved portion 33c of the spring 33 presses the connecting shaft 34, the play (play angle θ) corresponding to the fit clearance between the cam 31 and the connecting shaft 34 can be eliminated in a rotational direction in which the cam 31 restricts the rotation of the upper plate 26 relative to the lower plate 21. Accordingly, in a situation where operational force is inputted to the connecting shaft 34 in order to permit the rotation of the upper plate 26 relative to the lower plate 21, because the play corresponding to the fit clearance is eliminated, preferable operational feeling can be obtained. Further, because the curved portion 33c is formed from the spring 33 for biasing the cam 31 in a rotational direction in which the rotation of the upper plate 26 relative to the lower plate 21 is restricted, an increase in number of parts can be restricted.

Further, because the play corresponding to the fit clearance is eliminated, for example, at the time when a vehicle is in motion, noise generation caused by clattering of the operational lever 36 and the connecting shaft 34 with the cam 31c an be restricted.

(2) According to the embodiment, the curved portion 33c presses the connecting shaft 34 at a position axially adjacent to an axial fit position of the connecting shaft 34 to the cam 31. Accordingly, for example, comparing with a situation where the connecting shaft 34 is pressed at a position offset from the axial fit position of the connecting shaft to the cam 31, an axis line of the connecting shaft 34 can be more stabilized.

(3) According to the present embodiment, because a cross-sectional shape of the connecting shaft 34 (fitting portion 34b) is an approximate oval Japanese old coin, for example, comparing with a serration shape, a contact position of the connecting shaft 34 with the curved portion 33c can be simply ensured and the curved portion 33c can press the connecting shaft 34 more stably.

(4) According to the present embodiment, an assembly error between both lock mechanisms can be absorbed by using the fit clearance between the cam 31 and the connecting shaft 34.

A second embodiment of the present invention will be explained with reference to drawing figures. In a configuration of the second embodiment, a way of eliminating the play corresponding to the fit clearance between the cam and the connecting shaft in the first embodiment is changed. Accordingly, detailed explanations will be skipped for similar configurations.

Figure 4:
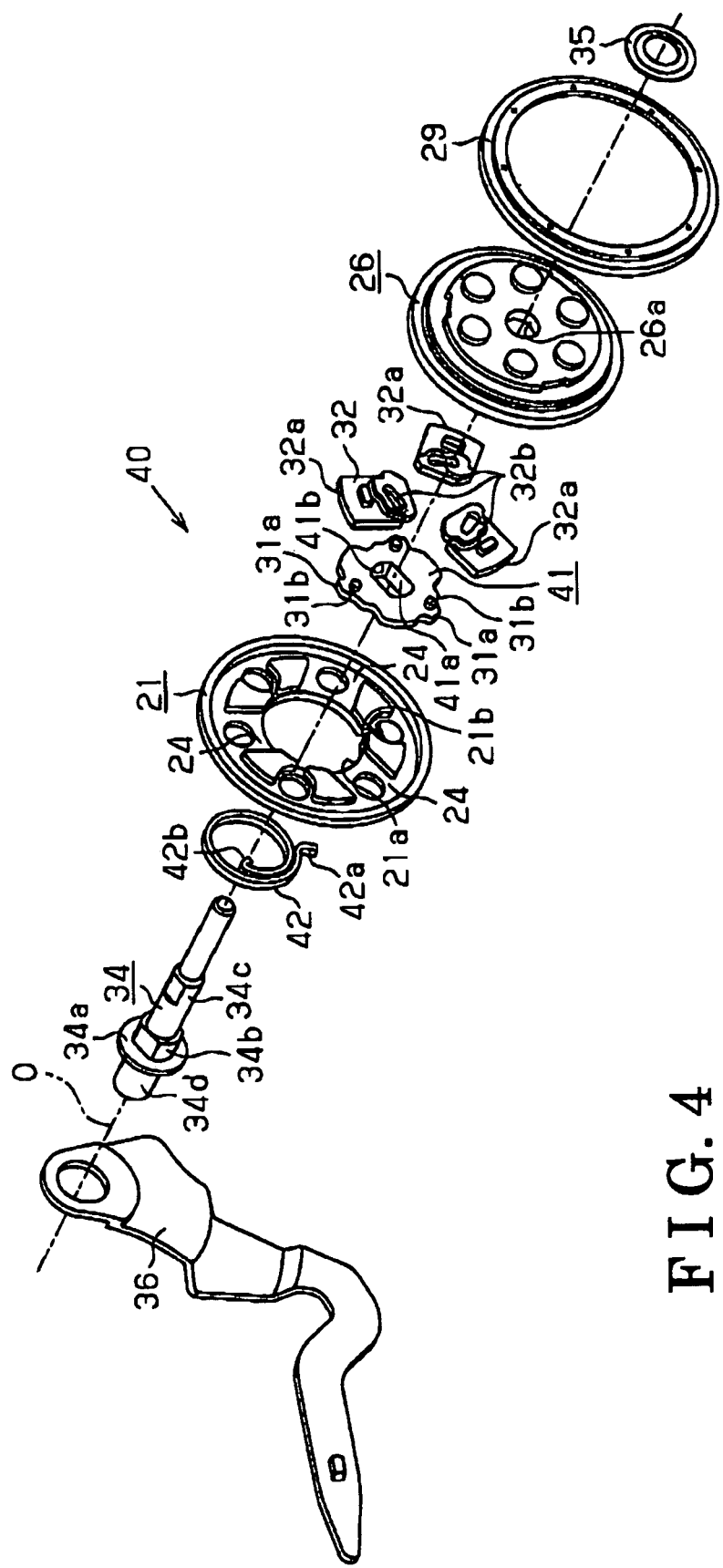
FIG. 4 represents an exploded perspective view illustrating a reclining apparatus for a vehicle seat according to a second embodiment of the present invention.
Figure 5:
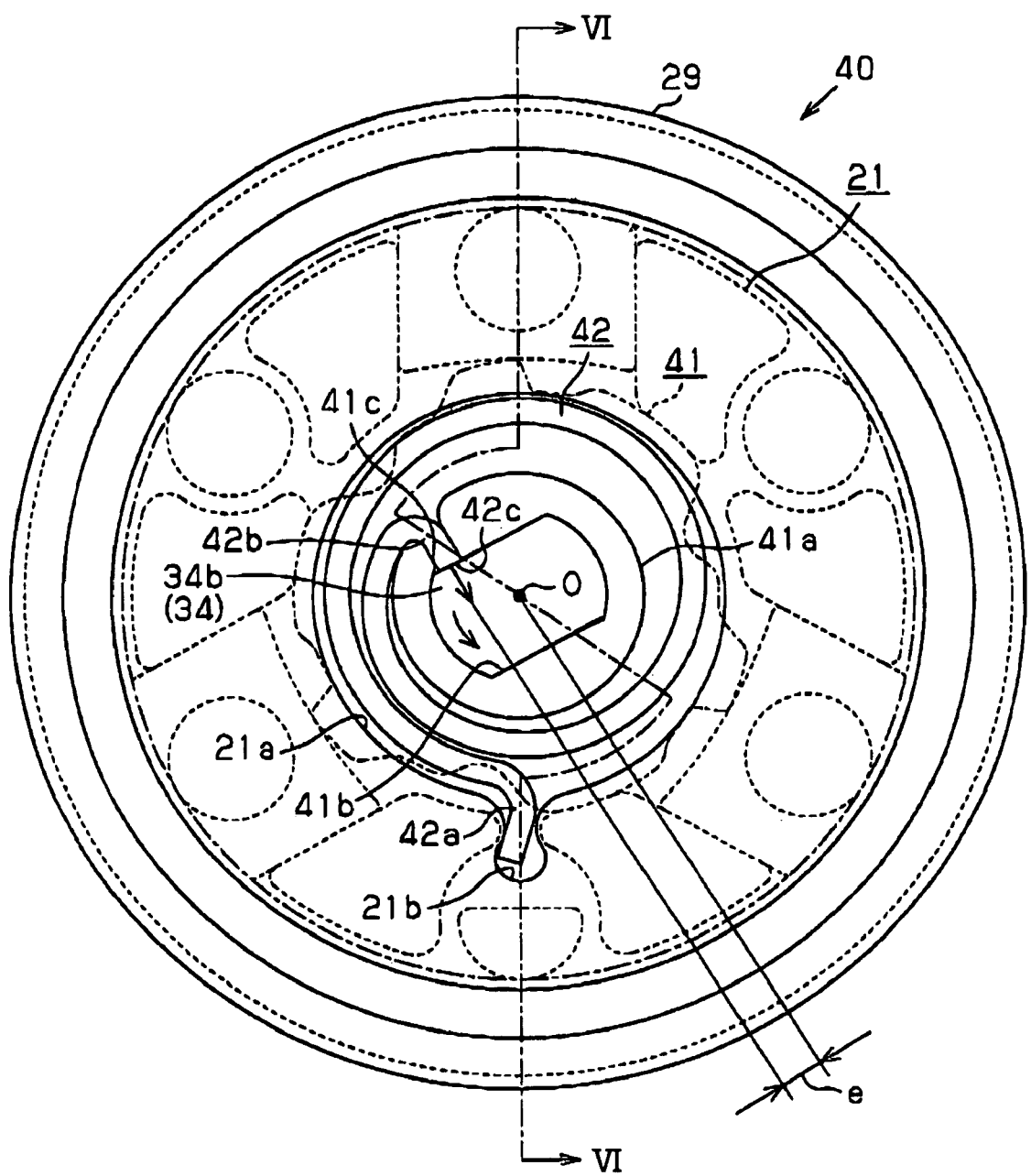
FIG. 5 represents a front view illustrating the reclining apparatus for the vehicle seat according to the second embodiment of the present invention.
Figure 6:
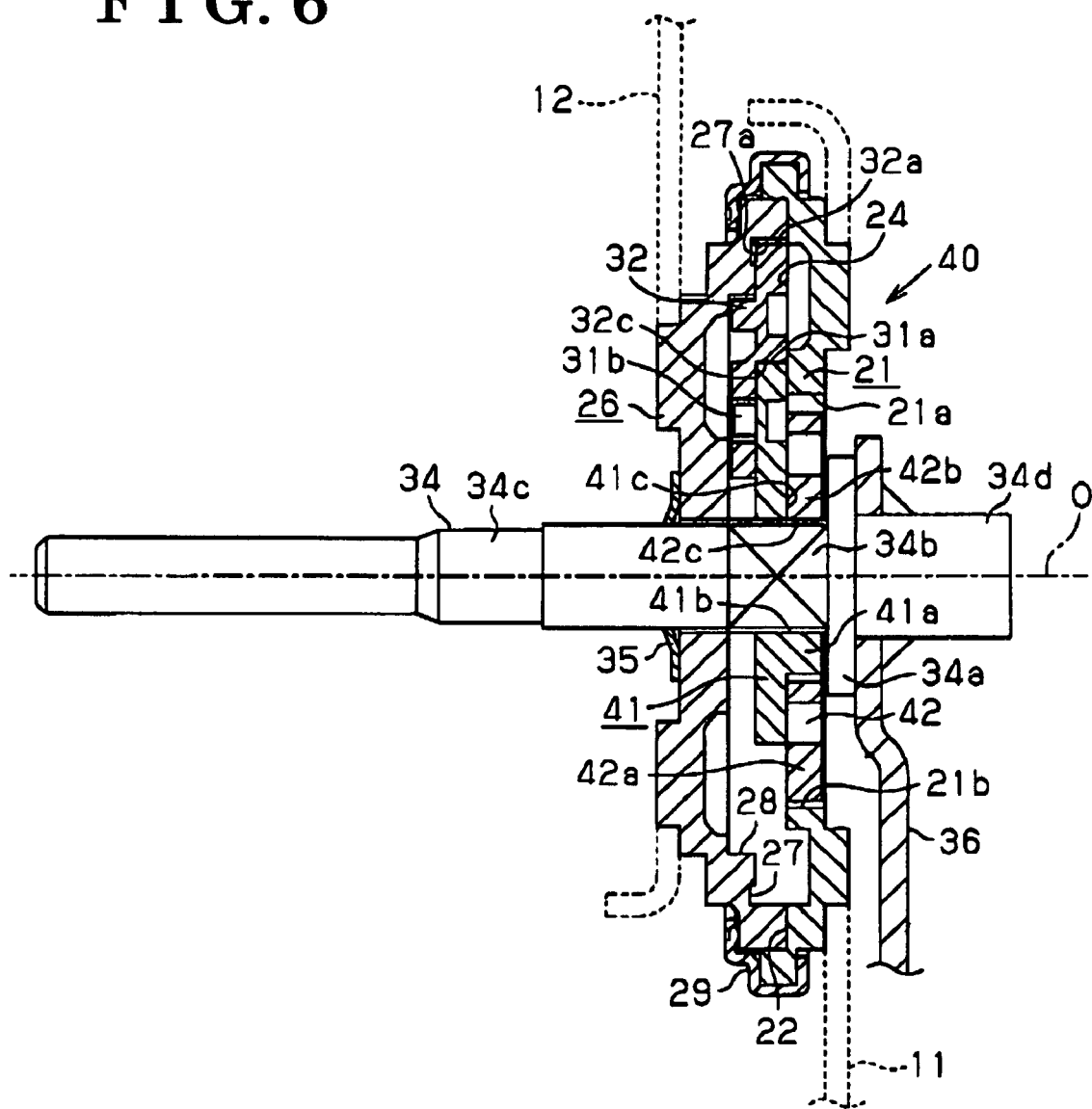
FIG. 6 represents a cross-sectional view taken on line VI-VI of FIG. 5.

FIG. 4 represents an exploded perspective view illustrating a reclining apparatus for a vehicle seat mounted on a vehicle such as automobiles. FIG. 5 represents a front view illustrating the reclining apparatus for the vehicle seat. FIG. 6 represents a cross-sectional view taken on line VI-VI of FIG. 5. As illustrated in FIG. 6, in a lock mechanism 40 according to the present embodiment, a cam 41 made of metal is accommodated between the lower plate 21 and the upper plate 26 (inner space). The cam 41 is rotatable around the rotational axis O as a center. The cam 41 includes a protruding wall portion 41a provided to cylindrically protrude in a first axial direction (toward lower plate 21) and a fitting hole 41b formed to penetrate the protruding wall portion 41a and a center portion of the cam 41 in an axial direction. An outer diameter of the protruding portion 41a of the cam 41 is smaller than an inner diameter of the penetrating hole 21a. A cross-sectional shape of the fitting hole 41b is a compressed circle shape (a shape of an approximate oval Japanese old coin). The fitting portion 34b of the connecting shaft 34 is fitted to the fitting hole 41b with a fit clearance in a rotational direction.

Further, as illustrated in FIG. 5, the protruding wall portion 41a includes a groove portion 41c formed to offset from the rotational axis O by the amount of eccentricity e and to extend in parallel with a diametrical direction and to open toward the fitting hole 41b. As illustrated in FIG. 6, in a state where the cam 41 is accommodated between the lower plate 21 and the upper plate 26 (inner space), the groove portion 41c (protruding wall portion 41a) is positioned so that a position of the groove portion 41c (protruding wall portion 41a) corresponds to an axial position of the penetrating hole 21a (and the engaging hole 21b).

As illustrated in FIG. 5, a spring 42 is accommodated in a center portion of the lower plate 21, in other words, at an inner peripheral side of the penetrating hole 21a. The spring 42 is made of a wire material having an approximate rectangular cross-section and formed to curve in a spiral shape. A first end 42a of the spring 42 is engaged with the engaging hole 21b of the lower plate 21. A second end 42b of the spring 42b is engaged with the groove portion 41c of the cam 41. The spring 42 is wound around the rotational axis O of the cam 41, in other words, at an outer peripheral side of the protruding wall portion 41a, so that the fitting hole 41b opens in an axial direction. The spring 42 biases the cam 41 to rotate relative to the lower plate 21 in a second direction (counterclockwise in FIG. 4). In other words, the spring 42 biases the cam 41 in a direction in which a state, where the rotation of the upper plate 26 relative to the lower plate 21 is restricted, is set.

Accordingly, the cam 41 basically retains, by biasing force of the spring 42, a state where the rotation of the upper plate 26 relative to the lower plate 21 is restricted. Thus, a state, where the rotation of the seat back frame 12 relative to the seat cushion frame 11 is restricted, is retained. Then, the cam 41 switches the restricted state to a state where the rotation of the upper plate 26 relative to the lower plate 21 is permitted when the cam 41 rotates clockwise in the figure relative to the lower plate 21 against the spring 42.

Here, the spring 42 according to the present embodiment will be further explained. As illustrated in FIG. 5, the spring 42 is wound counterclockwise in the figure from an inner peripheral side to an outer peripheral side. Then, the first end 42a of the spring 42 positioned at the outer peripheral side is bent outwardly in a diametrical direction and is inserted into and engaged with the engaging hole 21b. The second end 42b of the spring 42 positioned at the inner peripheral side is bent inwardly in a diametrical direction and is inserted into and engaged with the groove portion 41c.

At this time, the second end 42b guided to the fitting hole 41b through the groove portion 41c protrudes toward the fitting hole 41b. The second end 42b includes an end portion 42c as a pressing portion for elastically pressing a corner portion of the fitting portion 34b of an approximate oval Japanese coin-shape. Accordingly, pressing force offset from the rotational axis O by the amount of eccentricity e is applied to the connecting shaft 34. Thus, rotational torque is applied to the connecting shaft 34, and the connecting shaft 34 is biased counterclockwise in the figure relative to the cam 41. As described above, there is the fit clearance between the cam 41 (fitting hole 41b) and the connecting shaft 34 (fitting portion 34b) in a rotational direction. In other words, there is a play angle defined around the rotational axis O between the cam 41 (fitting hole 41b) and the connecting shaft 34 (fitting portion 34b). The end portion 42c presses the connecting shaft 34 counterclockwise in the figure so that the play angle corresponding to the fit clearance can be eliminated, in other words, in a rotational direction in which the cam 41 restricts the rotation of the upper plate 26 relative to the lower plate 21. It is needless to say that the end portion 42c presses the connecting shaft 34 at an axial fit position of the connecting shaft 34 to the cam 41.

As detailed above, according to the present embodiment, following effects can be obtained in addition to effects (1), (3) and (4) in the first embodiment. (1) According to the present embodiment, the end portion 42c presses the connecting shaft 34 at the axial fit position of the connecting shaft 34 to the cam 41. Accordingly, for example, comparing with a situation where the connecting shaft 34 is pressed at a position offset from the axial fit position of the connecting shaft 34 to the cam 41, an axis line of the connecting shaft 34 can be more stabilized.

A third embodiment of the present invention will be explained with reference to drawing figures. In a configuration of the third embodiment, a way of eliminating the play corresponding to the fit clearance between the cam and the connecting shaft in the first embodiment is changed. Accordingly, the same reference numbers are assigned to similar configurations and detailed explanations of the similar configurations will be skipped.

Figure 7:
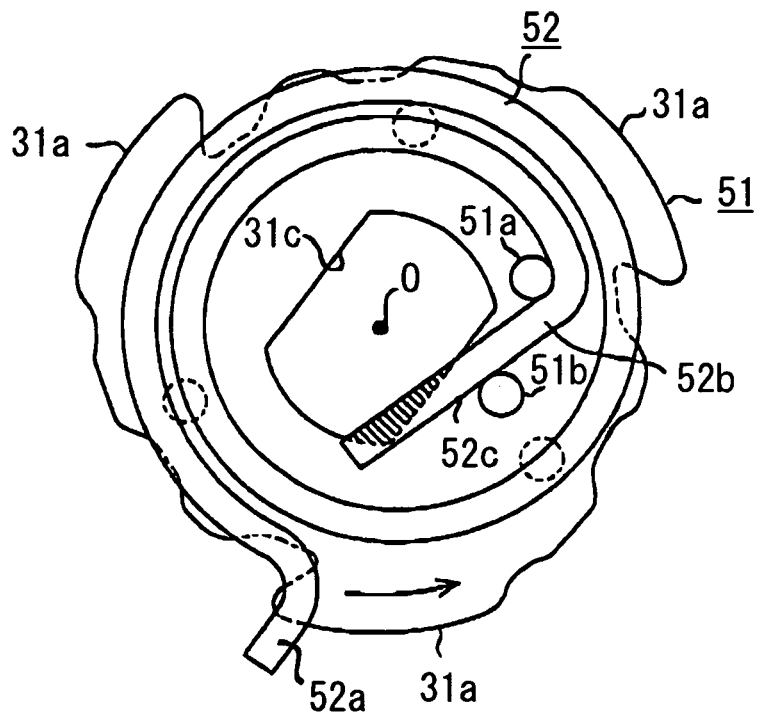
FIG. 7 represents a front view illustrating a third embodiment of the present invention.
Figure 8:
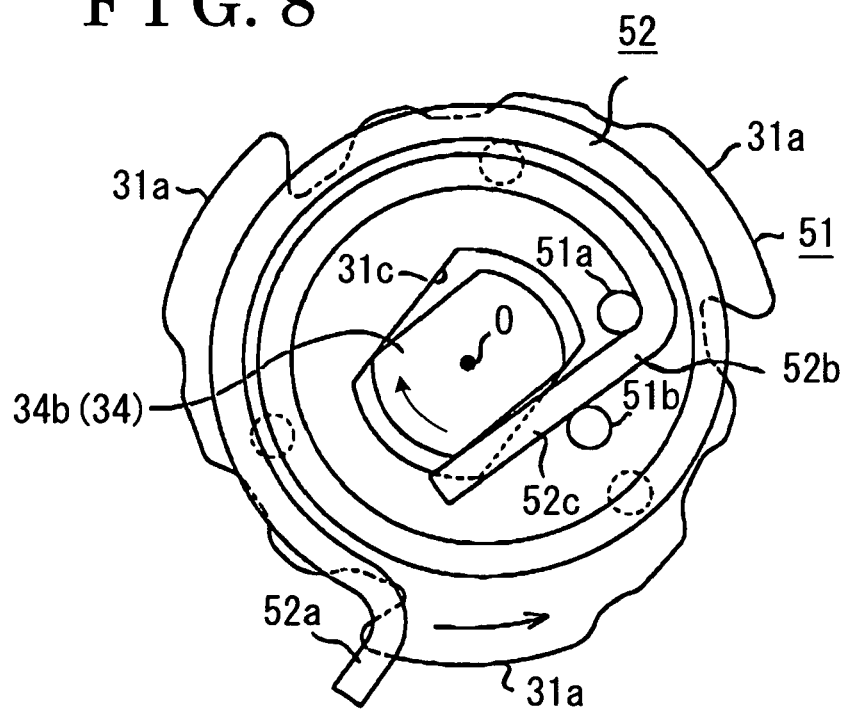
FIG. 8 represents a front view illustrating the third embodiment of the present invention.

FIGS. 7 and 8 represent a front view illustrating a part of a lock mechanism included in a reclining apparatus for a vehicle seat according to the present embodiment. A cam 51 is accommodated between the lower plate 21 and the upper plate 26 (inner space). The cam 51 is rotatable around the rotational axis O as a center. The cam 51 is made of metal. As illustrated in FIG. 7, in the lock mechanism according to the present embodiment, the cam 51 includes, instead of the protruding portion 31d described above, a pair of pin-shape protrusions 51a and 51b extending in parallel with an axial direction. The protrusions 51a and 51b are positioned so as to have a certain distance therebetween.

A spring 52 is accommodated in the center portion of the lower plate 21. The spring 52 is made of a wire material having an approximate rectangular cross-section and formed to curve in a spiral shape. The wire material is wound counterclockwise in the figure from an inner peripheral side to an outer peripheral side. A first end 52a of the spring 52 is engaged with the engaging hole 21b (refer to FIG. 2) of the lower plate 21. A second end 52b of the spring 52 is engaged with the protrusions 51a and 51b of the cam 51.

In other words, the spring 52 is inserted between the protrusions 51a and 51b. Accordingly, a position of the linear second end 52b of the inner peripheral side formed from a bended end portion of the spring 52 is determined by the protrusion 51a at an inner peripheral side of a base portion of the second end 52b. At the same time, a position of the linear second end 52b is determined by the protrusion 51b at an outer peripheral side of a middle portion of the second end 52b. The second end 52b forms a terminal portion 52c, which extends from a position of the protrusion 51b. The terminal portion 52c serves as the pressing portion. The spring 52 is wound around the rotational axis O of the cam 51 so that the fitting hole 31c is basically opened in an axial direction. However, as illustrated by hatchings in FIG. 7, the terminal portion 52c of the spring 52 overlaps with an outer peripheral side part of the fitting hole 31c.

The spring 52 biases the cam 51 in a rotational direction in which the state, where the rotation of the upper plate 26 relative to the lower plate 21 is restricted, is set (arrow direction in the figure). Accordingly, the cam 51 basically retains the state where the rotation of the upper plate 26 relative to the lower plate 21 is restricted by biasing force of the spring 52. Therefore, the state, where the rotation of the seat back frame 12 relative to the seat cushion frame 11 is restricted, is retained. Then, the cam 51 switches the restricted state to the state where the rotation of the upper plate 26 relative to the lower plate 21 is permitted when the cam 51 rotates clockwise in the figure relative to the lower plate 21 against the spring 52.

As illustrated in FIG. 8, the terminal portion 52c, which overlaps with the outer peripheral side part of the fitting hole 31c, elastically presses the corner portion of the fitting portion 34b, of which a shape is an approximate oval Japanese coin. Accordingly, pressing force is applied to the connecting shaft 34 and rotational torque is given to the connecting shaft 34. Therefore, the connecting shaft 34 is biased clockwise in the figure relative to the cam 5 1. As described above, there is a fit clearance between the cam 5 1 (fitting hole 31c) and the connecting shaft 34 (fitting portion 34b) in a rotational direction. Accordingly, there is a play angle around the rotational axis O as a center between the cam 51 (fitting hole 31c) and the connecting shaft 34 (fitting portion 34b). The terminal portion 52c presses the connecting shaft 34 clockwise in the figure so that the play angle corresponding to the fit clearance is eliminated. In other words, the terminal portion 52c presses the connecting shaft 34 in a rotational direction in which the cam 51 permits the rotation of the upper plate 26 relative to the lower plate 21. It is needless to say that the terminal portion 52c presses the connecting shaft 34 at a position axially adjacent to an axial fit position of the connecting shaft 34 to the cam 51.

As detailed above, according to the present embodiment, following effects can be obtained in addition to the effects (2) to (4) obtained in the first embodiment.

(1) According to the present embodiment, the terminal portion 52c of the spring 52 presses the connecting shaft 34. Accordingly, the play corresponding to the fit clearance between the cam 51 and the connecting shaft 34 can be eliminated in a rotational direction in which the cam permits the rotation of the upper plate 26 relative to the lower plate 21. Therefore, when operational force is inputted to the connecting shaft 34 in order to permit the rotation of the upper plate 26 relative to the lower plate 21, because the play corresponding to the fit clearance is eliminated, improved operational feeling can be obtained.

In other words, because the play corresponding to the fit clearance between the cam 51 and the connecting shaft 34 is preliminarily eliminated in the rotational direction in which the cam 51 permits the rotation of the upper plate 26 relative to the lower plate 21, when input of the operational force to the connecting shaft 34 is started, the cam 51 is immediately rotated in the rotational direction in which the rotation of the upper plate 26 relative to the lower plate 21 is permitted, and permission of the rotation (lock release) is started. At this time, because the operational force for rotating the connecting shaft 34 with the cam 51 gradually increases against the biasing force of the spring 52, a smooth operational feeling can be obtained. In other words, a user can feel that there is no insensitive range to operate the cam 51 by the operational lever 36 and the cam 51 is directly operated by the operational lever 36. Further, because the terminal portion 52c is formed from the spring 52 for biasing the cam 51 in the rotational direction in which the rotation of the upper plate 26 relative to the lower plate 21 is restricted, an increase in number of parts can be restricted.

Further, because the play corresponding to the fit clearance is eliminated, for example, at the time when a vehicle is in motion, clattering of the operational lever 36 and the connecting shaft 34 with the cam 51, which causes noise generation, can be restricted.

The embodiments can be modified as follows. In the first embodiment, a position of the curved portion 33c for pressing the connecting shaft 34 is one example. Here, a curved portion can be formed at an opposite side across the rotational axis O. The curved portion can press an opposite corner portion of the fitting portion 34b, of which a shape is an approximate oval Japanese coin. In short, any configuration can be employed if the spring 33 presses the connecting shaft 34 in a rotational direction in which the cam 31 restricts the rotation of the upper plate 26 relative to the lower plate 21.

In the second embodiment, a position of the end portion 42c for pressing the connecting shaft 34 is one example. Here, a groove portion can be formed at an opposite side of the cam 41 across the rotational axis O. An end portion of the second end 42b guided from the groove portion can press an opposite corner portion of the fitting portion 34b, of which a shape is an approximate oval Japanese coin. In short, any configuration can be employed if the spring 42 presses the connecting shaft 34 in a rotational direction in which the cam 41 restricts the rotation of the upper plate 26 relative to the lower plate 21.

In each embodiment described above, cross-sectional shapes of the fitting holes 31c and 41b and the fitting portion 34b are not limited to an approximate oval Japanese coin, but can be a D-character shape or a polygonal shape. Further, the compressed circle shape includes an oval shape, or the like.

In each embodiment described above, positions of the springs 33 or 42 and the curved portion 33 or the end portion 42c for pressing the connecting shaft 34 can be offset from the axial fit position of the connecting shaft to the cam 31 or 41.

In each embodiment described above, the lower plate 21 is retained at the seat cushion side and the upper plate 26 is retained at the seat back side. However, inversely, the lower plate 21 can be retained at the seat back side and the upper plate 26 can be retained at the seat cushion side.

Next, a technical idea, which can be grasped from the embodiments and the variations described above, will be added. The reclining apparatus for the vehicle seat according to any one of claims 1 to 8, a cross-sectional shape of the connecting shaft fitted to the cam is a compressed circle shape (a shape of an approximate oval Japanese coin), a D-character shape or a polygonal shape. According to the configuration, because the cross-sectional shape of the connecting shaft is the compressed circle shape, the D-character shape or the polygonal shape, for example, comparing with a serration shape, a contact position of the connecting shaft with the pressing portion can be simply ensured and the pressing portion can press the connecting shaft more stably.

According to a first aspect of the present invention, a reclining apparatus for a vehicle seat includes a lower plate provided at each side of either one of a seat cushion and a seat back, an upper plate provided at each side of the other of the seat cushion and the seat back and rotatably supported by each lower plate, a cam operatively connected to each lower and upper plate for restricting or permitting rotation of each upper plate relative to each lower plate as each cam rotates, a connecting shaft fitted to each cam with a fit clearance for integrally rotating each cam in order to permit the rotation of each upper plate relative to each lower plate according to operational force inputted to the connecting shaft and a spring wound around a rotational axis of each cam for biasing each cam in a rotational direction in which the rotation of each upper plate relative to each lower plate is restricted. A first end of each spring is engaged with each lower plate and a second end of each spring is engaged with each cam. The spring includes a pressing portion for pressing the connecting shaft in a first rotational direction so that a play corresponding to the fit clearance between each cam and the connecting shaft can be eliminated.

According to a second aspect of the present invention, in the reclining apparatus for the vehicle seat according to the first aspect, the first rotational direction of the connecting shaft is a rotational direction in which each cam restricts the rotation of each upper plate relative to each lower plate.

According to a third aspect of the present invention, in the reclining apparatus for the vehicle seat according to the second aspect, each cam include a protruding portion with which the second end of each spring is engaged and which receives pressing force from each spring and a position of a curved portion of each spring which functions as the pressing portion for applying pressing force to the connecting shaft is different from that of the protruding portion of each cam with which the second end of each spring is engaged.

According to a fourth aspect of the present invention, in the reclining apparatus for the vehicle seat according to the third aspect, a position of pressing the connecting shaft by the pressing portion of each spring is adjacent to a fit position of the connecting shaft to each cam regarding an axial direction.

According to a fifth aspect of the present invention, in the reclining apparatus for the vehicle seat according to the second aspect, each cam includes a protruding wall portion which has a fitting hole which fits to the connecting shaft, the protruding wall portion which protrudes from each cam in an axial direction, the protruding wall portion of each cam includes a groove portion which opens to the fitting hole side of each cam and with which the second end of the spring is engaged, and an end portion of the second end of each spring engaged with the groove portion of each cam and guided to the fitting hole side of each cam functions as the pressing portion for pressing the connecting shaft.

According to a sixth aspect of the present invention, in the reclining apparatus for the vehicle seat according to the fifth aspect, a position of pressing the connecting shaft by the pressing portion of each spring is the same as a fit position of the connecting shaft to each cam regarding an axial direction.

According to a seventh aspect of the present invention, in the reclining apparatus for the vehicle seat according to the first aspect, the first rotational direction is a rotational direction in which each cam permits the rotation of each upper plate relative to each lower plate.

According to an eighth aspect of the present invention, in the reclining apparatus for the vehicle seat according to the seventh aspect, each cam includes a protrusion with which the second end of each spring is engaged and a terminal portion of each spring extended from the second end of each spring functions as the pressing portion for applying pressing force to the connecting shaft.

According to the first aspect, the connecting shaft for integrally rotating each cam is fitted to each cam with the fit clearance in a rotational direction in order for absorbing assembly error in the rotational direction. Then, because the pressing portion of each spring presses the connecting shaft, the play corresponding to the fit clearance between each cam and the connecting shaft is eliminated in a first rotational direction. Accordingly, in a situation where operational force is inputted to the connecting shaft in order for permitting the rotation of each upper plate relative to each lower plate, because the play corresponding to the fit clearance is eliminated, improved operational feeling can be obtained. Further, because the pressing portion is formed from each spring for biasing each cam in a rotational direction in which the rotation of each upper plate relative to each lower plate is restricted, an increase in number of parts can be restricted.

According to each second, third and fifth aspect, because the pressing portion of each spring presses the connecting shaft, the play corresponding to the fit clearance between each cam and the connecting shaft is eliminated in the rotational direction in which each cam restricts the rotation of each upper plate relative to each lower plate. Accordingly, in a situation where operational force is inputted to the connecting shaft in order to permit the rotation of each upper plate relative to each lower plate, because the play corresponding to the fit clearance is eliminated, improved operational feeling can be obtained. In other words, at an initial stage of an operation, operational force is necessary for rotating the connecting shaft against pressing force of the pressing portion of each spring. After that, operational force is necessary for rotating the connecting shaft with each cam against biasing force of each spring. Accordingly, smooth operational feeling can be obtained during operation. In other words, a user can feel that operation of each cam by the connecting shaft is well controlled.

According to the fourth aspect, because the position of pressing the connecting shaft by the pressing portion of each spring is adjacent to the fit position of the connecting shaft to each cam regarding an axial direction, for example, comparing with a situation where the position of pressing the connecting shaft is apart from the fit position of the connecting shaft to each cam regarding the axial direction, an axis line of the connecting shaft can be more stabilized.

According to the sixth aspect, because the position of pressing the connecting shaft by the pressing portion of each spring is the same as the fit position of the connecting shaft to each cam regarding an axial direction, for example, comparing with a situation where a position of pressing the connecting shaft is different from the fit position of the connecting shaft to each cam regarding the axial direction, an axis line of the connecting shaft can be more stabilized.

According to each seventh and eighth aspect, because the pressing portion of each spring presses the connecting shaft, the play corresponding to the fit clearance between each cam and the connecting shaft is eliminated in a rotational direction in which each cam permits the rotation of each upper plate relative to each lower plate. Accordingly, in a situation where operational force is inputted to the connecting shaft in order to permit the rotation of each upper plate relative to each lower plate, because the play corresponding to the fit clearance is eliminated, improved operational feeling can be obtained. In other words, because the play corresponding to the fit clearance between each cam and the connecting shaft is preliminarily eliminated in the rotational direction in which each cam permits the rotation of each upper plate relative to each lower plate, in a situation where input of the operational force to the connecting shaft is started, each cam is immediately rotated in the rotational direction in which the rotation of each upper plate relative to each lower plate is permitted, and permission of the rotation is started. At this time, because the operational force for rotating the connecting shaft with each cam gradually increases against the biasing force of each spring, a smooth operational feeling can be obtained. In other words, a user can feel that there is no insensitive range of operation of each cam by the connecting shaft and each cam is directly operated by the connecting shaft.

According to each first to eighth aspect, a reclining apparatus for a vehicle seat, by which improved operational feeling can be obtained while an increase in number of parts is restricted, can be provided.

The principles, preferred embodiment and mode of operation of the present invention, have been described in the foregoing specification. However, the invention that is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A reclining apparatus for a vehicle seat, comprising:
   a lower plate provided at each side of either one of a seat cushion and a seat back;
   an upper plate provided at each side of the other of the seat cushion and the seat back and rotatably supported by each lower plate;
   a cam operatively connected to each lower and upper plate for restricting or permitting rotation of each upper plate relative to each lower plate as each cam rotates;
   a connecting shaft fitted to each cam with a fit clearance for integrally rotating each cam in order to permit the rotation of each upper plate relative to each lower plate according to operational force inputted to the connecting shaft; and
   a spring wound around a rotational axis of each cam, a first end of each spring engaged with each lower plate and a second end of each spring engaged with each cam, for biasing each cam in a rotational direction in which the rotation of each upper plate relative to each lower plate is restricted, the spring including a pressing portion which contacts the connecting shaft for pressing the connecting shaft in a first rotational direction so that a play corresponding to the fit clearance between each cam and the connecting shaft can be eliminated.

2. The reclining apparatus for the vehicle seat according to claim 1, wherein
   the first rotational direction of the connecting shaft is a rotational direction in which each cam restricts the rotation of each upper plate relative to each lower plate.

3. The reclining apparatus for the vehicle seat according to claim 2, wherein
   each cam include a protruding portion with which the second end of each spring is engaged and which receives pressing force from each spring and a position of a curved portion of each spring which functions as the pressing portion for applying pressing force to the connecting shaft is different from that of the protruding portion of each cam with which the second end of each spring is engaged.

4. The reclining apparatus for the vehicle seat according to claim 3, wherein
a position of pressing the connecting shaft by the pressing portion of each spring is adjacent to a fit position of the connecting shaft to each cam regarding an axial direction.

5. The reclining apparatus for the vehicle seat according to claim 2, wherein
each cam includes a protruding wall portion which has a fitting hole which fits to the connecting shaft, the protruding wall portion which protrudes from each cam in an axial direction, the protruding wall portion of each cam includes a groove portion which opens to the fitting hole side of each cam and with which the second end of the spring is engaged, and an end portion of the second end of each spring engaged with the groove portion of each cam and guided to the fitting hole side of each cam functions as the pressing portion for pressing the connecting shaft.

6. The reclining apparatus for the vehicle seat according to claim 5, wherein
a position of pressing the connecting shaft by the pressing portion of each spring is the same as a fit position of the connecting shaft to each cam regarding an axial direction.

7. The reclining apparatus for the vehicle seat according to claim 1, wherein
the first rotational direction is a rotational direction in which each cam permits the rotation of each upper plate relative to each lower plate.

8. The reclining apparatus for the vehicle seat according to claim 7, wherein
each cam includes a protrusion with which the second end of each spring is engaged and a terminal portion of each spring extended from the second end of each spring functions as the pressing portion for applying pressing force to the connecting shaft.

9. A reclining apparatus for a vehicle seat, comprising:
a lower plate provided at each side of either one of a seat cushion and a seat back;
an upper plate provided at each side of the other of the seat cushion and the seat back and rotatably supported by each lower plate;
a cam operatively connected to each lower and upper plate for restricting or permitting rotation of each upper plate relative to each lower plate as each cam rotates;
a connecting shaft fitted to each cam with a fit clearance for rotating each cam in order to permit the rotation of each upper plate relative to each lower plate according to operational force inputted to the connecting shaft, the connecting shaft including an outer surface presenting a profile; and
a spring biasing each cam in a first rotational direction in which the rotation of each upper plate relative to each lower plate is restricted, the spring including a pressing portion which contacts the connecting shaft pressing the connecting shaft in the first rotational direction to eliminate a play corresponding to the fit clearance between each cam and the connecting shaft;
wherein each spring possesses first and second ends, and both first and second ends terminate at a position outside of the profile of the connecting shaft.

10. The reclining apparatus for the vehicle seat according to claim 9, wherein
the first rotational direction of the connecting shaft is a rotational direction in which each cam restrict the rotation of each upper plate relative to each lower plate.

11. The reclining apparatus for the vehicle seat according to claim 10, wherein
each spring is wound around the rotational shaft of each cam, the first end of each spring is engaged with each lower plate and the second end of each spring is engaged with each cam.

12. The reclining apparatus for the vehicle seat according to claim 11, wherein
each cam includes a protruding portion with which the second end of each spring is engaged and which receives pressing force from each spring and a position of a curved portion of each spring which functions as the pressing portion for applying pressing force to the connecting shaft is different from that of the protruding portion of each cam with which the second end of each spring is engaged.

13. The reclining apparatus for the vehicle seat according to claim 9, wherein
the first rotational direction is a rotational direction in which each cam permits the rotation of each upper plate relative to each lower plate.

14. The reclining apparatus for the vehicle seat according to claim 13, wherein
each spring is wound around the rotational shaft of each cam, the first end of each spring is engaged with each lower plate and the second end of each spring is engaged with each cam.

15. The reclining apparatus for the vehicle seat according to claim 14, wherein
each cam includes a protrusion with which the second end of each spring is engaged and a terminal portion of each spring extended from the second end of each spring functions as the pressing portion for applying pressing force to the connecting shaft.

* * * * *